United States Patent [19]
Van Der Meer

[11] Patent Number: 6,000,317
[45] Date of Patent: *Dec. 14, 1999

[54] COFFEE MAKER

[75] Inventor: Sijtze Van Der Meer, Drachten, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/990,924

[22] Filed: Dec. 15, 1997

[30] Foreign Application Priority Data

Dec. 23, 1996 [EP] European Pat. Off. .............. 96309398

[51] Int. Cl.$^6$ .............................. A47J 31/52; A47J 31/54
[52] U.S. Cl. .................. 99/282; 99/280; 99/283
[58] Field of Search ............................. 99/280, 281, 282, 99/283, 299; 426/433

[56] References Cited

U.S. PATENT DOCUMENTS

| | | | |
|---|---|---|---|
| 5,014,611 | 5/1991 | Ily et al. ..................................... | 99/280 |
| 5,115,730 | 5/1992 | Gockelmann .............................. | 99/280 |
| 5,375,508 | 12/1994 | Knepler et al. ........................... | 99/280 |
| 5,440,972 | 8/1995 | English ..................................... | 99/282 |
| 5,738,001 | 4/1998 | Liverani ................................. | 99/280 X |

FOREIGN PATENT DOCUMENTS

2554620A1  7/1976  Germany .

*Primary Examiner*—Reginald L. Alexander
*Attorney, Agent, or Firm*—Ernestine C. Bartlett

[57] ABSTRACT

A coffee maker for brewing coffee comprises a water reservoir, a heating chamber and a pump which pumps water from the reservoir through the heating chamber to a filter device. The heating chamber is provided with a temperature sensor which causes regulation of the power supply to the heating element (16) and also provides temperature information to a control device. The control device controls the operation of the pump so that the brewing process is automated, and the pump is operated only when the water at the outlet of the heating device (10) is at a suitable temperature. The heating device (10) may be a low-mass instantaneous flow heater.

12 Claims, 1 Drawing Sheet

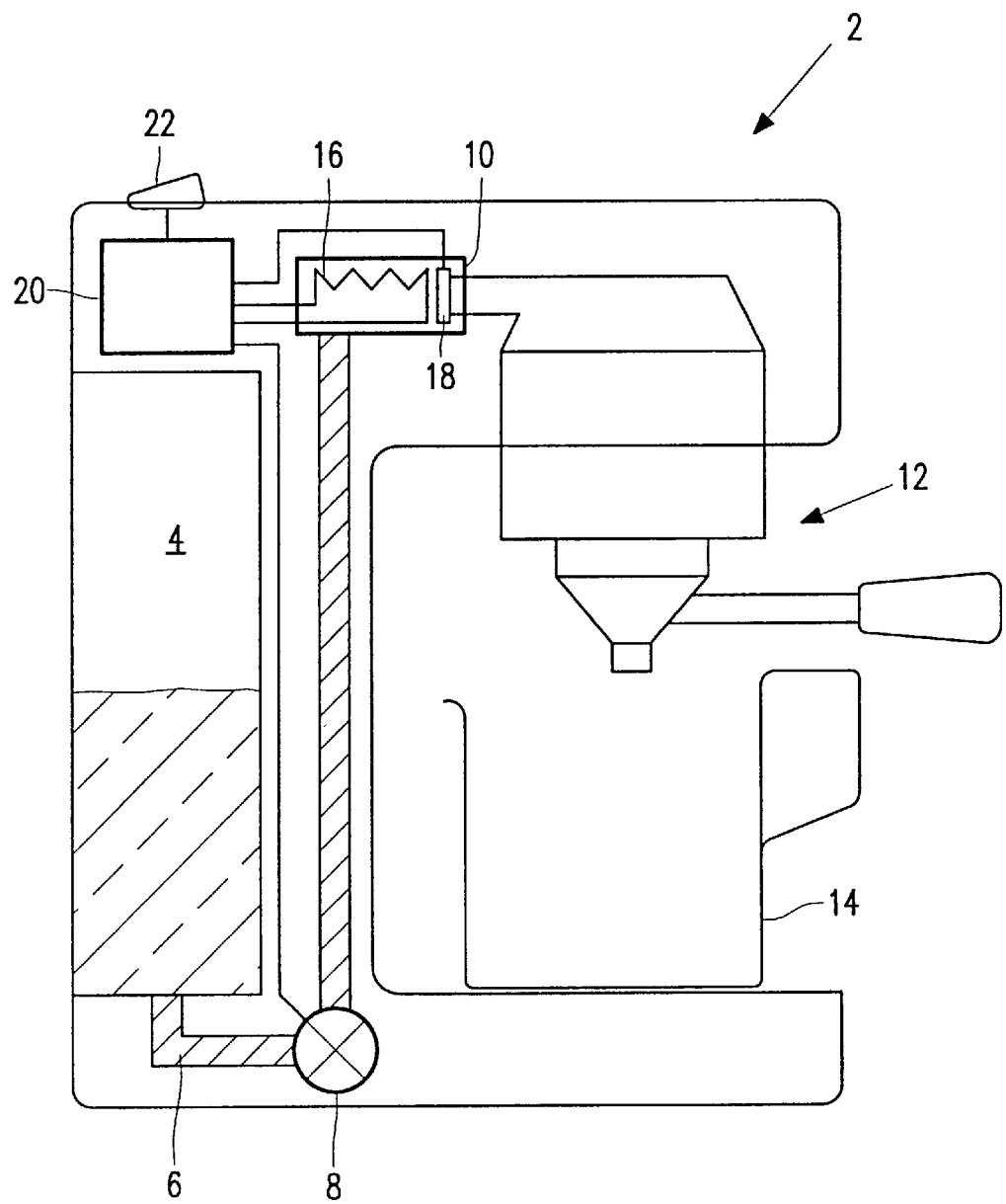

COFFEE MAKER

FIELD OF THE INVENTION

This invention relates to coffee makers, particularly to coffee makers using a pumped heating system, in which hot water is supplied to a coffee filter under pressure. This type of heating system is commonly used in an espresso coffee machine.

BACKGROUND OF THE INVENTION

Conventionally, the type of coffee maker described above has two stages of operation. When the power to the coffee maker is turned on, the heating element is activated, and a temperature of the heating system is thermostatically controlled. When the heating system has reached a desired temperature, this is indicated to the user, for example by illumination of a lamp. From then on, the user may select when the coffee is to be brewed, by operating a switch which activates the pump to drive the hot water through the coffee filter device.

One example of this type of coffee maker is shown in GB 1 538 238, which discloses a coffee maker for brewing coffee comprising a water reservoir, a heating chamber and a pump which pumps water from the reservoir through the heating chamber to a filter device, the heating chamber being provided with a temperature sensor. The temperature sensor is provided for regulating the water temperature within the heating chamber.

SUMMARY OF THE INVENTION

According to the invention, the temperature sensor provides temperature information to a control device, the control device controlling the actuation of the pump.

The coffee maker of the invention enables the complete brewing cycle to be controlled automatically without the need for the operator to monitor the operation of the coffee maker during the brewing process.

Preferably, the heating chamber comprises a conduit through which water from the reservoir flows, and a heating element is thermally coupled to the conduit. This type of heating arrangement is a low-mass heating system which enables almost immediate coffee brewing without the need initially to heat a large quantity of water in the water reservoir. Such a heating system requires electronic temperature control, and for this purpose the control device controls the power applied to the heating element in dependence upon the temperature sensor signal.

A flow sensor may be provided for measuring the flow from the reservoir, and providing flow information to the control device. This arrangement enables a preselected quantity of coffee to be brewed and pumped automatically.

BRIEF DESCRIPTION OF THE DRAWING

The drawing is a schematic illustration of a coffee maker according to the invention.

DESCRIPTION OF THE PREFERRED EMBODIMENTS

The invention will now be described by way of example, with reference to the accompanying drawing which shows the coffee maker of the invention. The FIGURE shows a coffee maker 2 comprising a water reservoir 4 having an outlet 6 which is fed to the inlet of a pump 8. The outlet of the pump 8 is connected to a heating device 10 which supplies hot water to a filter device 12, where brewing takes place. Within the filter device 12, the water passes through the coffee and into a receptacle 14. During use of the coffee maker 2 shown in the FIGURE, water is pumped from the reservoir 4 by the pump 8 to the heating device 10, and from the heating device to the filter device 12. The heating device 10 includes a heating element 16 and a thermostatic control element 18 which controls the supply of power to the heating element 16 so as to maintain the water temperature within the heating device 10 (or at the outlet of the device 10) within desired temperature boundaries. The control element senses a temperature of the heating device, and this sensed temperature can represent the water temperature when the operating characteristics of the heating device are known. It may alternatively be possible to place a temperature sensor within the water flow path (with appropriate seals) to detect the actual water temperature.

The operation of the coffee maker as described so far is conventional. A conventional system also generally includes a visual indicator for identifying when the temperature of water in the heating device 10 has reached suitable temperature for coffee brewing, and the operation of the pump may subsequently be initiated manually by the user.

The invention provides a control circuit 20 which receives temperature information from the thermostatic control element 18 and controls the actuation of the pump 8. This enables the coffee maker 2 to be provided with a single control selector 22 for the user of the coffee maker 2, and the brewing process is automated to provide delivery of water to the filter device 12 only when the water has reached the correct temperature. The control device 20 preferably comprises a microprocessor control system.

A preferred form of heating device 10 comprises a tube through which the water is pumped, having a printed heating element disposed on the outer surface of the tube, for heating the water in the tube through the tube wall. Such a heating device may be designed so that the flow conditions generated by the pump cause the water within the tube to spiral outwardly against the inner surface of the tube wall. This results in a relatively low mass of water being heated, but with the possibility of a relatively high flow rate through the tube. This has the advantage that the water within the heating device 10 may be brought to the brewing temperature (for example 92° C. to 96° C.) within a very short space of time. For given pump characteristics, the flow rate through the heating device 10 will be dictated by the resistance to flow introduced by the filter device 12, which may depend largely upon the nature or quantity of the coffee in the filter device. Of course, the heating device 10 should be capable of heating water to the desired temperature at the maximum expected flow rate. For lower flow rates, the thermostatic control element 18 regulates the power supplied to the heating element 16 to maintain the water at the output of the heating device 10 at the desired temperature.

This power regulation may, for example, comprise an electronic temperature sensor, for example an NTC or PTC sensor, coupled with the control device, the control device operating a power switch to switch the heating element on and off. The cyclic operation of the heating element then maintains the desired temperature. The power switch may, for example, comprise a thyristor-based circuit, as will be appreciated by those skilled in the art.

The operation of the coffee maker 2 shown in the FIGURE is thus as follows. The single control selector 22 simply comprises a power switch which is turned on by the user when coffee is to be brewed. The control device 20 then activates the heating element 16, and monitors the control element 18 in order to determine when operation of the pump should be commenced.

The control element 18 may comprise a thermostatic switch, which effectively provides a binary temperature signal, as well as regulating the power supply to the element. In this case, once the predetermined temperature has first been reached at the control element 18, the heating element is able to provide continuous heating. The control device 20 recognizes the switching of the thermostatic switch, and the pump may then be operated. Thus, a delay is established between the operation of the heating element and the pump, which corresponds to the time required for the heating device to reach a desired temperature.

Alternatively, the thermostatic control element may include a temperature sensor to enable the temperature to be monitored continuously. In this case, the initial temperature measured by the element 18 may be used to calculate a delay between the actuation of the heating element 16 and of the pump 8. The control device may then control the power applied to the heating element 16 (for example by varying a duty cycle or altering the voltage applied to the heating element terminals) in dependence upon the continuous temperature measurement. In both arrangements of the control element 18 described above, the control element functions as a temperature sensor.

The pump 8 is then activated by the control device 20 to drive hot water from the heating device 10 to the filter device 12. During pumping, the temperature at the output of the heating device 10 is maintained at the desired brewing temperature by controlling the power to the heating element 16 during brewing.

At the end of the brewing process, the pump and the heating element are deactivated. The heating element may be switched off after the pump, for example after a fixed delay, so that all water in the heating device 10 is expelled from the system as steam. The switch off may be initiated by the user by turning off the coffee maker 2 at the control selector 22, or alternatively there may be automatic switch off when it has been determined that the brewing process is ended. There are various ways in which it can be determined that the brewing process has finished. If the entire content of the reservoir 4 is to be brewed, the heating device 10 may include an additional sensor which is responsive to the absence of water, for example a level sensor or an additional temperature sensor.

Alternatively (or additionally), the coffee maker 2 may be provided with a control selector for inputting-to the control device 20 the desired amount of coffee to be brewed. In this case, a flow detector may be provided in the flow path between the reservoir 4 and the filter device 12, for example between the pump and the heating device 10, to measure the total flow of water during the brewing process. In this case, the control device will deactivate the heating element 16 and pump 8 when the desired flow has taken place. As a further alternative, the operating time of the pump 8 may be controlled depending upon the desired quantity of coffee to be brewed.

The use of a low-mass flow heater 10 as described above not only provides the advantage that coffee may be brewed almost immediately, but also ensures that there is always a minimal amount of water in the coffee maker 2 other than in the reservoir 4. In general, the reservoir 4 may be removed from the main housing of the coffee maker 2 for emptying or cleaning, and emptying of the reservoir 4 may be desirable when the coffee maker 2 has been standing for a prolonged period of time. In a conventional pumped system, the heating device 10 includes a relatively large chamber which may therefore contain a relatively large amount of water, and which cannot easily be removed from the system before use. As described above, the power for the heating element may be left on for a predetermined time to empty the heating device 10.

Espresso coffee machines commonly include a steam outlet nozzle. Of course, the coffee maker 2 of the invention may be provided with such a nozzle. The outlet of the heating device may be provided with a three way valve, which is switchable between a "coffee" outlet and a "steam" outlet. The control device may then operate the heating device at a higher power (with suitable thermostatic control) when the steam position is selected to produce steam at the outlet of the heating device.

The control system of the invention may be applied to commercial coffee makers, where the water level in the reservoir 4 would not be permitted to fall below a predetermined level, by using an external water supply source. In such a case, the coffee maker 2 would require control of the pump 8 to provide individual cups (or other selectable quantities) of coffee, and a system for supplying and removing coffee beans to and from a filter device 12 would be required. The various possibilities to enable this would be appreciated by those skilled in the art.

I claim:

1. A coffee maker for brewing coffee comprising a water reservoir, a heating chamber and a pump which pumps water from the reservoir through the heating chamber to a filter device, the heating chamber being provided with a temperature sensor, wherein:

a thermostatic control element includes a temperature sensor which provides temperature information to a control device, the control device controlling the actuation of the pump, the temperature sensor monitoring the temperature continuously, whereby the initial temperature measured by the temperature sensor is used to calculate a delay between the actuation of the heating element and of the pump, and the control device then controls the power applied to the heating element in dependence upon the continuous temperature measurement;

the heating chamber comprises a conduit through which water from the reservoir flows, and includes a heating element thermally coupled to the conduit; and a flow sensor measures the flow from the reservoir and supplies flow information to the control device.

2. A coffee maker as claimed in claim 1, wherein the control device receives temperature information from a thermostatic control element and controls the actuation of the pump, whereby the brewing process is automated to provide delivery of water to the filter device only when the water has reached the correct temperature.

3. A coffee maker as claimed in claim 2, wherein the thermostatic control element regulates the power supplied to the heating element to maintain the water at the output of the heating device at the desired temperature.

4. A coffee maker as claimed in claim 3, wherein the thermostatic control element comprises an electronic temperature sensor coupled with the control device, the control device operating a power switch to switch the heating element on and off.

5. A coffee maker as claimed in claim 1, wherein the control device comprises a microprocessor control system.

6. A coffee maker as claimed in claim 1, wherein the pump is then activated by the control device to drive hot water from the heating device to the filter device, the temperature at the output of the heating device during pumping being maintained at the desired brewing temperature by controlling the power to the heating element during brewing.

7. A coffee maker as claimed in claim 6, comprising means which at the end of the brewing process, cause the pump and the heating element to be deactivated.

8. A coffee maker for brewing coffee comprising a water reservoir, a heating chamber and a pump which pumps water from the reservoir through the heating chamber to a filter device, the heating chamber being provided with a temperature sensor, wherein:

the temperature sensor provides temperature information to a control device which controls the actuation of the pump;

the heating chamber comprises a conduit through which water from the reservoir flows, and includes a heating device thermally coupled to the conduit, the heating device including a tube through which the water is pumped having a printed heating element disposed on a surface thereof for heating water in the tube through the tube wall, wherein flow conditions generated in said heating device by the pump cause the water within the tube to spiral outwardly against the inner surface of the tube wall;

the control device controls the power applied to the heating element in dependence upon the temperature sensor signal; and a flow sensor measures the flow from the reservoir and provides flow information to the control device.

9. A coffee maker as claimed in claim 8, wherein cyclic operation of the heating element maintains the desired temperature.

10. A coffee maker for brewing coffee comprising a water reservoir, a heating chamber and a pump which pumps water from the reservoir through the heating chamber to a filter device, the heating chamber being provided with a temperature sensor, wherein:

a thermostatic control element includes a temperature sensor which provides temperature information to a control device which controls the actuation of the pump, the temperature sensor monitoring the temperature continuously, whereby the initial temperature measured by the temperature sensor is used to calculate a delay between the actuation of the heating element and of the pump, and the control device then controls the power applied to the heating element in dependence upon the continuous temperature measurement;

the heating chamber comprises a conduit, which includes a steam outlet nozzle, through which water from the reservoir flows, and includes a heating element thermally coupled to the conduit;

the pump is activated by the control device to pump hot water from the heating chamber to the filter device, the temperature at the output of the heating chamber during pumping being maintained at desired brewing temperature by the controlling the power to the heating element during brewing;

means at the end of the brewing process cause the pump and the heating element to be deactivated after a fixed delay, whereby water in the heating chamber is expelled as steam;

and said coffee maker further comprises a flow sensor measuring the flow from the reservoir, and wherein flow information is supplied to the control device.

11. A coffee maker for brewing coffee comprising a water reservoir, a heating chamber and a pump which pumps water from the reservoir through the heating chamber to a filter device, the heating chamber being provided with a temperature sensor, wherein:

a thermostatic control element includes a temperature sensor which provides temperature information to a control device which controls the actuation of the pump, the temperature sensor monitoring the temperature continuously, whereby the initial temperature measured by the temperature sensor is used to calculate a delay between the actuation of the heating element and of the pump, and the control device then controls the power applied to the heating element in dependence upon the continuous temperature measurement;

the heating chamber comprises a conduit through which water from the reservoir flows, and includes a heating element thermally coupled to the conduit and outlet provided with a valve, which is switchable between a "coffee" outlet and a "steam" outlet;

the pump is activated by the control device to pump hot water from the heating chamber to the filter device, the temperature at the output of the heating chamber during pumping being maintained at the desired brewing temperature by the controlling the power to the heating element during brewing;

means at the end of the brewing process cause the pump and the heating element to be deactivated;

and said coffee maker further comprises a flow sensor measuring the flow from the reservoir, and wherein flow information is supplied to the control device.

12. A coffee maker as claimed in claim 11, wherein the control device operates the heating device at a higher power when the steam position is selected to produce steam at the outlet of the heating device.

* * * * *